Patented Dec. 31, 1940

2,227,154

UNITED STATES PATENT OFFICE 2,227,154

PLASTICIZED POLYVINYL HALIDE COMPOSITION

John J. Russell, Schenectady, N. Y., assignor to General Electric Company, a corporation of New York No Drawing. Application April 12, 1938, Serial No. 201,563

5 Claims. (Cl. 260—36)

This invention relates generally to synthetic rubber-like resinous compositions and particularly to compositions comprising polyvinyl halide.

As is known, a polyvinyl halide, such as polyvinyl chloride, may be plasticized to yield synthetic rubber-like compositions. The most common plasticizer for this purpose is tricresyl phosphate. Polyvinyl halide compositions plasticized with tricresyl phosphate have, however, a relatively narrow temperature range in which they possess rubber-like properties and this materially limits their usefulness particularly at low temperatures. For example, a composition containing 60% polyvinyl chloride and 40% tricresyl phosphate, will break on flexing at temperatures below 0° F. Another, though less serious limitation, to its use as electrical insulation, is the tendency of the composition to lose plasticizer at elevated temperatures. Thus under certain accelerated test conditions it may lose as much as 55% of tricresyl phosphate at 125° C. over a period of 100 hours.

The ideal plasticizer for polyvinyl halide compositions is one which would impart properties to the plastic composition which will fit it for the following conditions:

1. Ability to withstand mechanical abuse tending to damage it when used as electrical insulation at temperatures as low as −10° F.
2. A minimum loss of plasticizer from the composition under accelerated test at 125° C. for 100 hours.
3. Extrudibility on wire.

By extensive investigation of the subject I have established the following conclusions:

1. Cold temperature flexibility requires the plasticizer to have—
    a. A relatively low molecular weight;
    b. A long aliphatic chain;
    c. Few aromatic substituents as possible;
    d. Relatively little branching of the sidechain in the aliphatic substituents.
2. Loss of plasticizer at elevated temperatures is small when the compound is—
    a. Of high molecular weight;
    b. Contains many aromatic groups;
    c. Has considerable branching of the sidechains in the aliphatic groups;
    d. Is compact in its structure.

Thus, it is apparent that the problem of finding in one compound all of the properties for the ideal plasticizer is complex. Investigation has, however, led to the discovery of a certain class of compounds which closely approach the ideal plasticizer. I have discovered that esters formed by the esterification of a relatively long chain saturated aliphatic dibasic acid containing at least six carbon atoms in the molecule (that is acids of the general class $(C_nH_{2n-2}O_4)$ where $n$ is at least 6 and preferably 6 to 12 inclusive) and alcohols of the class $C_6H_5(CH_2)_nOH$ where $n$ is an integer, closely approach the total of the combination of properties desired in a plasticizer to impart low temperature flexibility, high tensile strength and low loss of plasticizer in the plastic composition.

My invention will best be illustrated by the use of dibenzyl sebacate as an example of such plasticizer, although, as will be apparent, it is not limited thereto. In dibenzyl sebacate is found a compound possessing some of each of the requirements for the ideal plasticizer. For low loss of plasticizer it possesses high molecular weight and aromatic substituents. For good cold temperature flexibility it has a long aliphatic chain and no branching of this chain.

Dibenzyl sebacate may be prepared by the esterification of benzyl alcohol and sebacic acid. Specifically it may be prepared by mixing 1 mol of sebacic acid with 1.2 mols of benzyl alcohol and 0.25 to 0.50% by weight of d-camphor sulphonic acid as a catalyst, the mixture being heated and the water formed by esterification being distilled off. Upon completion of the reaction the mixture is agitated with 300 c.c. of ether for every 200 c.c. of the mixture and washed three times with 50 c.c. of saturated sodium carbonate solution. The ether is evaporated or distilled off and the excess benzyl alcohol removed by distillation. The dibenzyl sebacate is distilled at 1.5 mm. pressure at 234° C. to 240° C. The dibenzyl sebacate obtained is of a very light greenish-yellow color, with a slightly oily odor and is slightly heavier than water. It solidifies at about 25° C. to white needle crystals.

Dibenzyl sebacate is compatible with both polyvinyl chloride and tricresyl phosphate. Hence it can be used alone or with tricresyl phosphate as a plasticizer for the polyvinyl halide. When used alone as a plasticizer for polyvinyl chloride in the proportions of 60% polyvinyl chloride and 40% dibenzyl sebacate, by weight, the composition will withstand flexing without breaking above −40° F. With the addition of tricresyl phosphate, this limiting temperature may be varied from 0° F. to −40° F. depending upon the proportion of tricresyl phosphate used to replace the dibenzyl sebacate.

The cold temperature flexibility of the compositions is determined as follows:

A bar of the plasticized polyvinyl halide resinous composition ⅜" x ⅜" x 10" long is chilled to a definite temperature. It is then bent double. If the bar does not break the procedure is repeated, each time at a temperature 5° C. lower than the previous temperature, until the bar breaks. The temperature at which the bar breaks is called the cold temperature flexibility of the composition.

In the installation of insulated electrical wire kinks in the wire are usually straightened out by workmen by holding one end of a length of the wire and giving it a sharp snap or whip. This type of use requires the insulation to withstand impact shock under varied weather conditions without breaking or cracking. A so-called "whipping test" devised to test insulation for its ability to withstand this type of abuse is as follows:

A double loop of wire about 2 feet in diameter is insulated with the composition chilled to a definite temperature, and immediately beaten by an individual with as great force as possible. If the insulation does not crack, the test is repeated at a temperature about 5° C. lower and this procedure continued until it does break. Under such a test a composition containing 60% polyvinyl chloride and 40% tricresyl phosphate breaks at 10° C. while a composition containing 60% polyvinyl chloride and 40% dibenzyl sebacate breaks at −23° C. It is obvious that this type of test is more severe than the bar test described above.

In addition to dibenzyl sebacate which has been specifically illustrated, as it is the preferred plasticizer of this invention, other esters of the class enumerated above may be used.

For example, typical alcohols of the class enumerated above which may be used are: benzyl, phenyl ethyl, phenyl propyl, phenyl isopropyl, etc. Typical aliphatic dibasic acids of the class ($C_nH_{2n-2}O_4$) having 6 or more carbon atoms from which the esters may be prepared for the purposes of this invention, are adipic, pimelic, suberic, azelaic, sebacic, nonanedicarboxylic, decamethylenedicarboxylic, etc. The esters may be prepared by esterifying the alcohol and acid similar to the manner outlined above in connection with the preparation of dibenzyl sebacate as a typical example.

My invention includes not only the use of the simple esters but also the use with polyvinyl halide of the mixed esters and mixtures of the simple esters of the class described and in addition mixtures of these with other plasticizers for polyvinyl halides, such as, for example, in addition to tricresyl phosphate, acetylated esters of ricinoleic acid, acetylated esters of polymerized ricinoleic acid and others including such plasticizers as are mentioned in Semon Patent No. 1,929,453 of Oct. 10, 1933. Obviously, the properties of the plastic compositions will vary with the proportions of the various plasticizers used and in each case the proportions chosen must be suited to the properties desired in the product and the conditions of use.

What I claim as new and desire to secure by Letters Patent of the United States is:

1. An extrudable insulating composition for wire consisting of a polyvinyl halide and dibenzyl sebacate.

2. A composition consisting of polyvinyl chloride, tricresyl phosphate and dibenzyl sebacate.

3. A composition consisting of polyvinyl chloride, tricresyl phosphate, acetylated ester of ricinoleic acid and dibenzyl sebacate.

4. Polyvinyl halide plasticized with an ester of an aliphatic dibasic acid of the class $C_nH_{2n-2}O_4$, where $n$ is at least 6, and an alcohol of the class $C_6H_5(CH_2)_nOH$ where $n$ is an integer, the plasticized product having good tensile strength, cold temperature flexibility and low loss of plasticizer at elevated temperature.

5. Polyvinyl chloride plasticized with a benzyl ester of an aliphatic dibasic acid of the class $C_nH_{2n-2}O_4$, where $n$ is at least 6.

JOHN J. RUSSELL.